(12) United States Patent
Rylewski

(10) Patent No.: US 6,494,200 B1
(45) Date of Patent: Dec. 17, 2002

(54) DEVICE FOR TRANSFERRING HEAT BETWEEN A PANEL HEATED BY SOLAR RADIATION AND A WALL

(75) Inventor: Eugeniusz Rylewski, 43bis, avenue du Général Leclerc -, F 78470 Saint Remy les Chevreuse (FR)

(73) Assignee: Eugeniusz Rylewski, Saint Remy les Chevreuse (FR)

( * ) Notice: Subject to any disclaimer, the term of this patent is extended or adjusted under 35 U.S.C. 154(b) by 0 days.

(21) Appl. No.: 09/623,383
(22) PCT Filed: Feb. 26, 1999
(86) PCT No.: PCT/FR99/00444
§ 371 (c)(1), (2), (4) Date: Oct. 5, 2000
(87) PCT Pub. No.: WO99/45328
PCT Pub. Date: Sep. 10, 1999

(30) Foreign Application Priority Data

Mar. 4, 1998 (FR) ............................................. 98 02632
Aug. 14, 1998 (FR) ............................................. 98 10434

(51) Int. Cl.[7] .................................................. F24J 2/04
(52) U.S. Cl. ........................ 126/633; 126/634; 126/631
(58) Field of Search ................................. 126/633, 628, 126/629, 631, 704, 710, 634; 136/244

(56) References Cited

U.S. PATENT DOCUMENTS 4,058,109 A 11/1977 Gramm ...................... 126/704
4,379,449 A * 4/1983 Wiggins et al. ............. 126/633
4,403,600 A * 9/1983 Morrison et al. ........... 126/631
4,411,255 A 10/1983 Lee ............................ 126/633
4,469,087 A 9/1984 Cameron .................... 126/633
5,081,982 A * 1/1992 MacKenzie ................. 126/633

FOREIGN PATENT DOCUMENTS

| DE | 30 04 364 A | | 9/1980 |
| DE | 35 45 648 A | * | 8/1986 |
| EP | 0 028 800 A | * | 5/1981 |
| FR | 2 478 800 A | * | 9/1981 |
| FR | 2 509 023 A | | 9/1981 |

* cited by examiner

Primary Examiner—Josiah C. Cocks
(74) Attorney, Agent, or Firm—Staas & Halsey LLP

(57) ABSTRACT

A device for transferring heat between a panel heated by solar radiation and a wall surface, including an insulating plate mounted parallel between the panel and the wall surface, to define a closed external space between the panel and the insulating plate, and a closed internal space between the insulating plate and the wall. An air circulator is interposed between the external space and the internal space and can be put selectively in an open state allowing circulation of air between the external space and the internal space, and thus allowing thermal transfer between the panel and the wall, and a closed state preventing circulation of air between the external space and the internal space, and thus preventing thermal transfer between the panel and the wall.

16 Claims, 5 Drawing Sheets

DEVICE FOR TRANSFERRING HEAT BETWEEN A PANEL HEATED BY SOLAR RADIATION AND A WALL

BACKGROUND OF THE INVENTION

1. Field of the Invention

The invention relates to a device for transferring heat between a panel designed to be heated by solar radiation and a wall, such as for example the wall of a building.

2. Description of the Related Art

There are already known arrangements applied to the face of a building for capturing solar energy and heating a receiving medium such as, for example, an outside wall of the building or a volume of air inside the building.

These arrangements for capturing solar energy are sometimes also called "solar panels" or "transparent insulation".

An arrangement of this type is described for example in French Patent No. 92 03962.

This known device comprises a number of substantially horizontal shaped elements spaced apart and superposed to form a curtain having an external face designed to be exposed to solar radiation and an internal face designed to be arranged facing the receiving medium which is to be heated. This device thus permits the transfer of the heat while at the same time constituting an efficient insulation.

In such a device there is normally provided a conversion plate which forms part of the panel and which ensures the conversion of the solar energy into heat.

The transfer devices of the solar panel type are generally applied directly to the face of the building to allow not only a transfer of heat derived from the solar radiation collected, but also a thermal insulation when the solar radiation is absent.

SUMMARY OF THE INVENTION

The invention takes as its starting point an appreciation of the fact that the solar panels known at present are not able to deal with all the situations which are encountered in practice.

The applicants have come to appreciate that in fact four different situations exist and need to be dealt with:

a) the heat provided by the solar radiation is welcome and it needs to be transferred to the surface, for example a wall, to be heated.

b) an excess of solar heat is present and it is therefore necessary to avoid any transfer of heat between the panel and the surface to be heated.

c) there is no solar heat available and it is necessary it to avoid any loss of heat from the surface, for example the wall, towards the outside.

d) there is no incoming solar heat present but there is an excess of heat present in the surface. It is therefore necessary, to the extent possible, to reject this heat to atmosphere.

The principal aim of the invention is to provide a heat transfer device of the type defined in the introduction which is capable of handling in priority the first three situations (a, b, c). The fourth situation (d: cooling at night) demands in principle a supplementary logic and the handling of this situation is only really needed in certain climates.

The device according to the invention comprises, for this purpose, an insulating plate designed to be mounted between the panel and the wall surface, parallel to these, in such a way as to define a closed external space between the panel and the insulating plate and a closed internal space between the insulating plate and the wall, as well as air circulating means interposed between the external space and the internal space and capable of being put selectively in at least one of the following states:

an open state allowing circulation of air between the external space and the internal space and thus allowing thermal transfer between the panel and the wall;

a closed state preventing circulation of air between the external space and the internal space and thus preventing thermal transfer between the panel and the wall.

Thus, depending on the state (open or closed) of the air circulating means, it is possible to cause or on the contrary to prevent a transfer of heat between the panel and the wall. When the air circulating means are in an open state, a transfer of heat takes place between the panel and the wall. By contrast, when the air circulating means are in the closed state, there is no transfer of heat but on the contrary a good thermal insulation.

The invention thus achieves mastery over the transfer of heat by convection while preventing the direct conductive and/or radiative contact between the panel and the wall by interposing a particular device. This device, with its two empty spaces and its insulating plate between the panel and the wall, guarantees low conduction of heat as well as low transfer by radiation, while allowing the transfer of heat by convection.

The panel to which the invention is applied could be in any position: vertical, inclined or horizontal.

In principle the wall surface to which the heat is to be transferred is a masonry wall, but it could also take the form of a flat roof or even a vessel containing a liquid.

In one preferred embodiment of the invention the air circulating means comprise at least two openings provided in the insulating plate and each designed to provide communication between the external and internal space.

In practice it has been found that a single opening allows only very limited exchange of air.

The term "opening" such as is used here is intended to designate generally any passage, possibly including restrictions or bends, providing communication between the internal and external spaces of the device.

Preferably the air circulating means comprise two openings positioned substantially at the same height with respect to one wall of the device such as to allow limitation of the flow of air passing from one opening to another. By contrast, if the openings are not at the same height it is necessary to be able to block the natural flow of air, for example by means of a flap valve.

Preferably a partition or dividing wall is arranged in each of the external space and the internal space to define, in each of the said spaces, at least one path for circulation of generally U shape having two branches, one on each side of the partition.

This arrangement of U-shaped circuits consists essentially of vertical walls. It ensures good scouring of the surfaces and facilitates the circulation of the air in each of the external and internal spaces, as well as a circulation of the air from one to the other. An effect analogous to scouring could be obtained by other means, for example by bends or diversions, or even by other types of circuit for circulating air between the two above-mentioned spaces.

Preferably the said air circulating means comprise at least one first opening providing communication between a first branch of the external space and a first branch of the internal space, and at least one second opening providing communication between a second branch of the external space and a second branch of the internal space.

According to another feature of the invention the air circulating means comprise at least two openings extending through the insulating plate and of which at least one is provided with a flow regulating member designed to adopt one or the other of the open and closed conditions.

In one embodiment of the invention the control member comprises an electric or similar fan designed to be put into operation or out of operation corresponding respectively to the open condition and the closed condition.

Thus, when the fan is in operation a circulation of the air is obtained simultaneously in each of the external and internal spaces and from one space to the other. By contrast, when the fan is out of action the circulation of air is stopped.

In another embodiment the control member comprises an electric fan and a flap valve which is situated in the same opening as the electric fan and/or in another opening.

Preferably use is made of a gravity-operated flap which opens under the pressure of the air and closes under gravity. This valve is closed by gravity when the fan is not providing the pressure necessary to open it. When the fan and the valve are placed in two different openings, these latter are not necessarily at the same height. This valve could even be omitted if the two openings are situated at the same height, preferably high up or low down.

When the device is to used on a flat roof it is preferable to provide, in addition to the fan, a flap valve in each opening.

In place of a gravity-operated valve it is possible also to make use of a flap operated by a bimetal strip heated by the solar radiation or an electro-magnetically controlled flap. In certain versions one could even accept having a flap controlled manually by mechanical means.

When insolation is present and the transfer of heat to the wall surface is closed off, the temperature could attain levels which, for certain materials, in particular insulation, are excessive.

With this in mind, the invention provides means for protection against the occurrence of excessive temperatures.

One measure for this purpose consists in positioning a supplementary plate, which we call a stopper plate, between the panel and the insulating plate in order to create a closed blocking space between the external space and the insulating plate. If necessary this blocking space could be ventilated, preferably by a flow of atmospheric air through a fixed opening low down and another opening with- a valve higher up. This valve could be operated by a bimetallic strip when the temperature reaches a certain predetermined threshold. Should the occasion arise, the excess heat is removed to atmosphere.

Another step consists in placing an intermediate plate, which we call a conversion plate, between the panel and the insulating plate to create a first air circuit (or heating circuit) designed to transfer the heat between the intermediate plate and the wall surface or vice versa, and to create a second air circuit (or cooling circuit) designed to reject the heat to the outside. Equally it is provided that the first air circuit and the second air circuit have respectively first air circulating means and second air circulating means which are capable of being placed selectively and independently of one another in an open condition or a closed condition.

The conversion plate transforms the solar energy into heat and it then replaces that which normally comprises the panel.

The first circuit allows the transfer of the heat from the conversion plate to the wall surface or vice versa, depending on whether one is in a winter or a summer regime. The second circuit is designed to reject the heat to the outside: to evacuate the heat from the wall surface to the outside and/or extract the excess heat from the intermediate plate to the outside.

Preferably the first air circuit is a closed circuit capable of communicating with the outside through a small pressure-equalising opening, whereas the second air circuit is a closed circuit or is open to the outside.

By the expressions "closed circuit" and "open circuit" it is intended to make clear that the circulation of the air takes place in one or several spaces or volumes, respectively without communication with the outside and with communication with the outside.

The device of the invention furthermore includes control means designed to control the flow regulating member, for example the fan.

In one embodiment of the invention these control means comprise manual control means.

In another embodiment these control means comprises at least two temperature sensors designed to detect the temperatures respectively of the panel (or of a conversion plate) and of the wall surface, and to control the flow regulating member as a function of the difference in temperature between the panel (or conversion plate) and the wall surface.

In one embodiment which has been developed, these control means comprise electronic means.

Preferably the control means comprises at least one photo-responsive component designed to detect the insolation on a panel and to generate an electrical voltage representative of the insolation.

The photo-responsive component could be a photo-voltaic cell which will allow the generation of energy which can be used directly to drive the fan. However one could also make use of photo-transistors, photo-diodes or photo-resistances which provide a signal which can be used directly (through the intermediary of an amplifier) to operate the fan, or indirectly as data for a calculation by a logic circuit.

By way of example, one could make use of a photo-transistor coupled to a "Darlington" type of circuit which delivers an output power sufficient to drive a fan operating on a direct voltage of 12 volts.

The electrical voltage thus generated could be used either directly as energy for driving the flow regulating member or in the form of a signal for initiating or halting the operation of the flow regulating member.

In place of a photo-responsive component it is possible to envisage making use of at least one thermo-sensing component, for example a detector of the temperature or of the difference in temperature, a thermostat or a bimetallic strip.

The device according to the invention is preferably in the form of a module of standard or specific dimensions having a frame which supports the components of the device.

BRIEF DESCRIPTION OF THE DRAWINGS

In the description which follows and which is provided solely by way of example, reference is made to the accompanying drawings in which.

DESCRIPTION OF THE EMBODIMENTS

Figure 1:
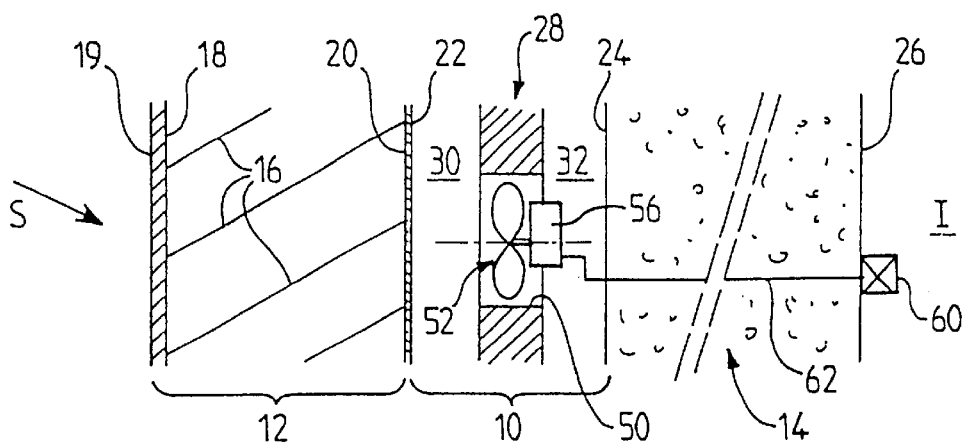
FIG. 1 is a partly sectioned view of a transfer device according to the invention placed between a panel designed to be heated by solar radiation and a wall surface to be heated.

We refer first to FIG. 1 which shows a heat transfer device 10 according to the invention, mounted between a panel 12 designed to be heated by solar radiation S and a wall surface 14 which constitutes the wall of a building. The panel 12, also known as a "solar panel" or "transparent insulation" is, in this example, realized in accordance with the teaching of French Patent No. 92 03962. It will be understood that this panel could take another form, of a kind, which allows the capture of solar energy.

In the example the panel 12 comprises a number of substantially horizontal identically-shaped elements 16 spaced from one another, and superposed in a substantially vertical plane to form a kind of curtain. This curtain has an external face 18 and an internal face 20. The external face 18 is closed by a transparent plate 19 (for example a sheet of glass) designed to be exposed to solar radiation S. The internal face 20 is closed by a plate 22 such as a metal sheet colored black.

The plate 22 constitutes a conversion plate which transforms the solar energy into heat. It could be separate from the panel 12, as will be seen later.

The shaped elements 16 allow the conduction of solar energy from the external face of the curtain to the internal face, that is to say towards the metal plate 22. Furthermore these shaped elements define between them rising channels which create a number of warm cushions of air. These cushions of air are held immobile and constitute at the same time a very good insulator with a reduced coefficient of thermal loss.

The wall surface 14, which constitutes the wall of a building, has an external face 24 facing towards the device 10 and an internal face 26 facing towards the interior I of the building.

The transfer device 10 comprises essentially an insulating plate 28 designed to be mounted between the panel 12 and the wall 14, in a disposition substantially parallel to the latter. This insulating plate 28 is spaced away from the panel 12 and wall surface 14 in such a way as to define on the one hand an external closed space 30 between the panel and the insulating plate and on the other hand an internal closed space 32 between the insulating plate and the wall surface.

Figure 2:
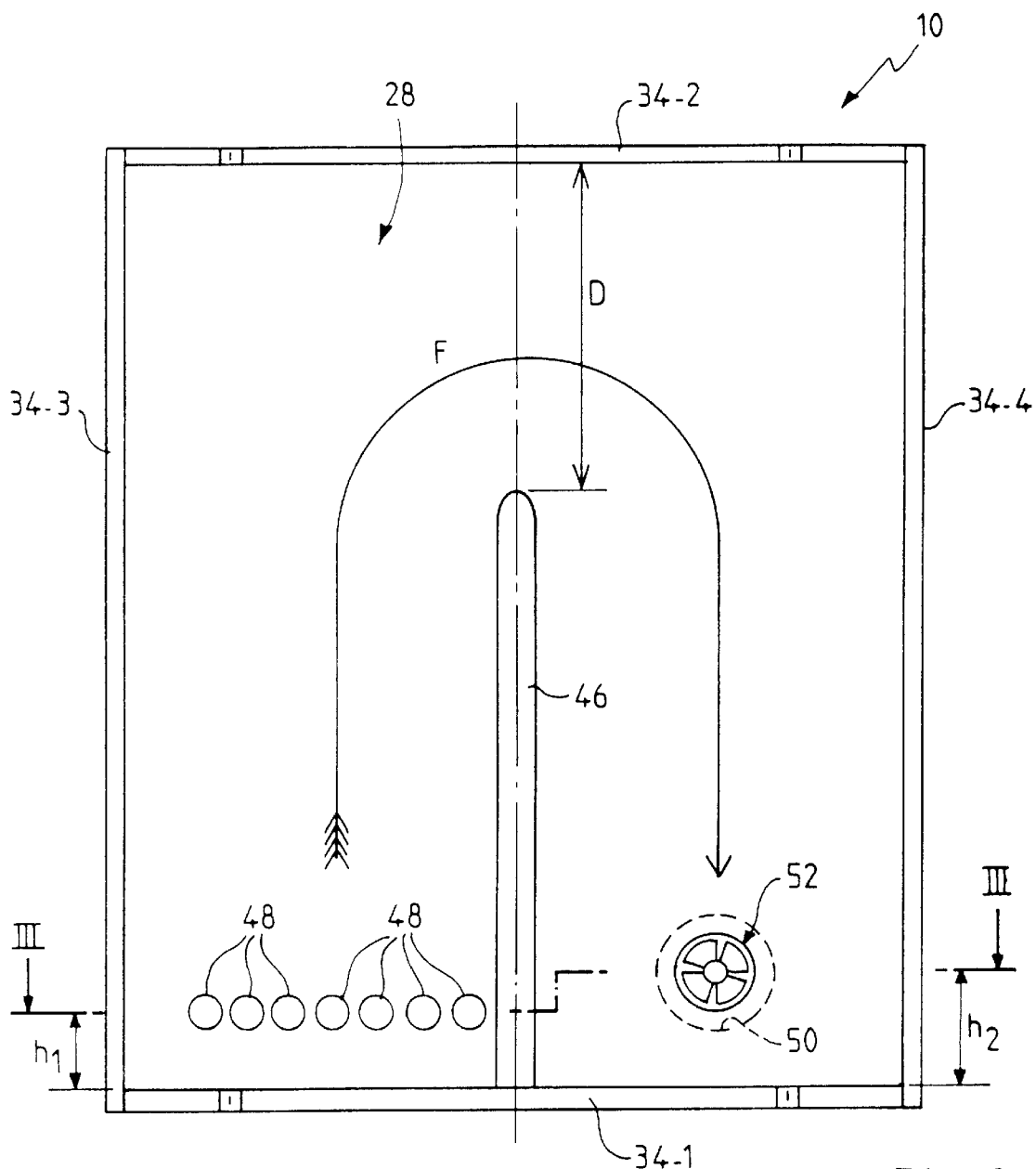
FIG. 2 is an elevation of a transfer device according to the invention in the form of a modular element.
Figure 3:
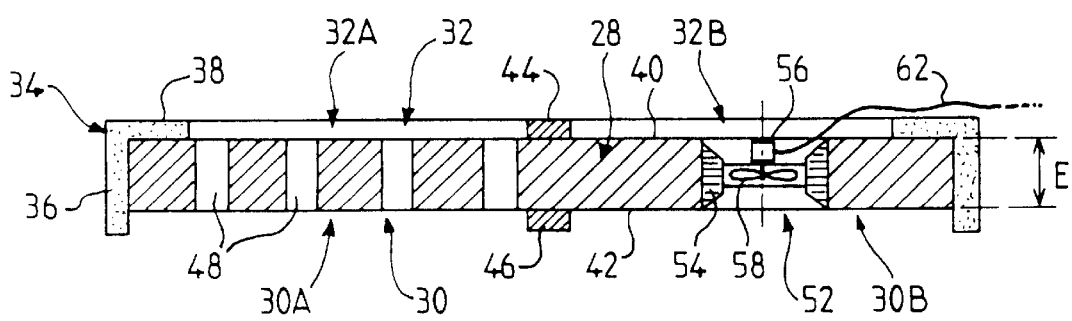
FIG. 3 is a section on the line III—III in FIG. 2.

We now refer to FIGS. 2 and 3 to describe in detail the structure of the transfer device 10. This device is realized in the form of a modular element of generally rectangular shape (FIG. 2) capable of having standard dimensions or dimensions adapted to need.

The insulating plate 28 is supported by a frame 34 having, in vertical section, the shape of an angle-iron having a limb 36 surrounding the periphery of the insulating plate 28 and a limb 38 designed to be applied against the external face 24 of the wall 14 (FIG. 3).

This plate 28 is made of a thermally insulating material such as a foam of plastics material, of minerals fibers, etc. The insulating plate 28 has a face 40 designed to be applied against the limb 38 of the frame and an opposing face 42. It has a thickness E which could for example be between 1 and 10 centimeters.

The frame 34 has a lower face 34-1, an upper face 34-2 and two vertical sides 34-3 and 34-4.

The device 10 furthermore has two substantially vertical partitions, namely a partition 44 arranged along the face 40 of the insulating plate 28 and a vertical partition 46 arranged along the face 42 of the insulating plate 28 (FIG. 3).

Each of these partitions extends away from the lower face 34-1 of the frame and terminates at a distance D from the upper face 34-2 of the frame (FIG. 2). The partitions 44 and 46 are of substantially the same height. The result is that the external space 30 and the internal space 32 have a generally U-shaped configuration.

The insulating plate 28 has a series of first openings 48 passing through the plate at intervals and aligned on a horizontal line situated at a height h1 with respect to the lower wall 34-1 of the frame. These openings 48 provide communication between a first branch 30-A of the external space 30 and a first branch 32-A of the internal space 32 (FIG. 3).

In addition, the insulating plate 28 is provided with a second opening 50 situated at a level h2 with respect to the lower wall 34-1 of the frame (FIG. 2) and providing communication between a second branch 30-B of the external space 30 and a second branch 32-B of the internal space 32.

Thanks to the partitions 44 and 46, to the opening 48 and to the opening 50, the air can circulate in a circulation path F of generally U shape, simultaneously in the external space 30 and the internal space 32.

In accordance with the invention, the device has a fan 52 (FIGS. 1, 2 and 3) which is mounted in the circular opening 50. This fan has a casing 54 designed to be located in the opening 50 and carrying an electric motor 56 serving to drive a fan rotor 58.

This fan 52 thus provides mechanical ventilation regulating the amount of air circulating in each of the spaces 30 and 32 and between the latter. The fan can be set either in an open state (operation) or in a closed state (stop).

When the fan is in operation it causes a circulation of air between the spaces 30 and 32 and thus allows a transfer of heat between the panel 12 and the wall surface 14.

By contrast, when the fan is stopped, it prevents the circulation of air between the spaces 30 and 32 and thus prevents a transfer of heat between the panel 12 and the wall surface 14.

In the embodiment of FIG. 1 the fan 52 has a manual control 60 situated in the interior I of the building and connected to the fan through an electric cable 62 (FIGS. 1 and 3).

Figure 4:
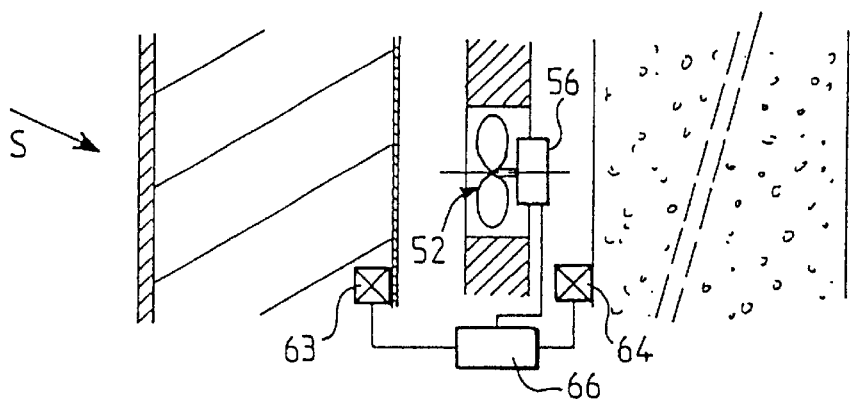
FIGS. 4, 5 and 6 are views analogous to FIG. 1 and showing other variants.

In the embodiment of FIG. 4 the control means for the fan comprise two temperature sensors 63 and 64 designed to detect the temperatures of the panel 12 (plate 22) and of the wall surface 14 respectively. These sensors 63 and 64 are connected to a differential thermostat 66 designed to control the fan 52 in response to the difference in temperature between the panel and the wall surface. The result in that control of the fan is achieved automatically.

This automatic control can be sophisticated to a greater or lesser degree and can incorporate, for example, electronic control means to take account of the principal parameters involved and thus to optimize the transfer of heat as a function of the thermal conditions and of the requirements.

Figure 5:
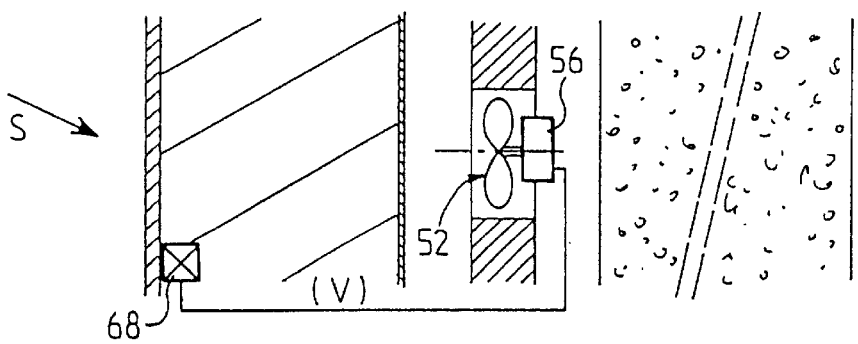

In the embodiment of FIG. 5, the control means include at least one photo-voltaic cell 68 carried by the panel 12 and designed to detect the insolation on a panel and to generate an electrical voltage V representative of the insolation. In the case of FIG. 5, this electrical voltage is used directly as the energy for driving the electric motor of the fan 52.

Figure 6:
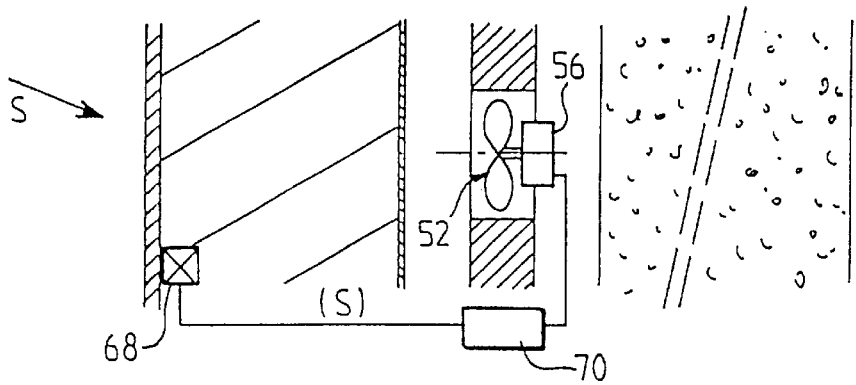

In the embodiment of FIG. 6, the control means likewise include at least one photo-voltaic cell 68. However it is utilized in this case to provide a signal S to a unit 70 for initiating or halting the operation of the fan 52.

Each of the modular elements, which could have a horizontal extent of for example between 1 and 2 meters and have a vertical height of for example between 1.50 and 2 meters, constitutes an independent module equipped with its own fan.

According to the invention the control of the fans could be global, the fans being thus liked in parallel or on the contrary individually, each fan responding to its own command. Individual control could be of the interest because it makes it possible in particular to take account of the shade projected on to the face of the building by trees or neighboring houses.

In the case where the device has sophisticated control means these latter take account simultaneously of the temperature of the panel 12 and that of the wall surface 14, as well as the external and internal temperatures. These control means incorporate instructions and criteria in addition.

The panel 10, also known as transparent insulation, could be rudimentary, given that the device 12 according to the invention is the main contribution to the transfer of heat.

Thus this device 10 is not necessarily limited to a device as described in French Patent 92 03962 referred to above.

By way of example the device 10 could include a glazed facade (glass, polycarbonate, etc) constituting the external face 18, an empty space with vents for example, films or non-woven transparent materials provided for restricting the movement of air; and a black sheet to constitute the plate 22.

Figure 7:
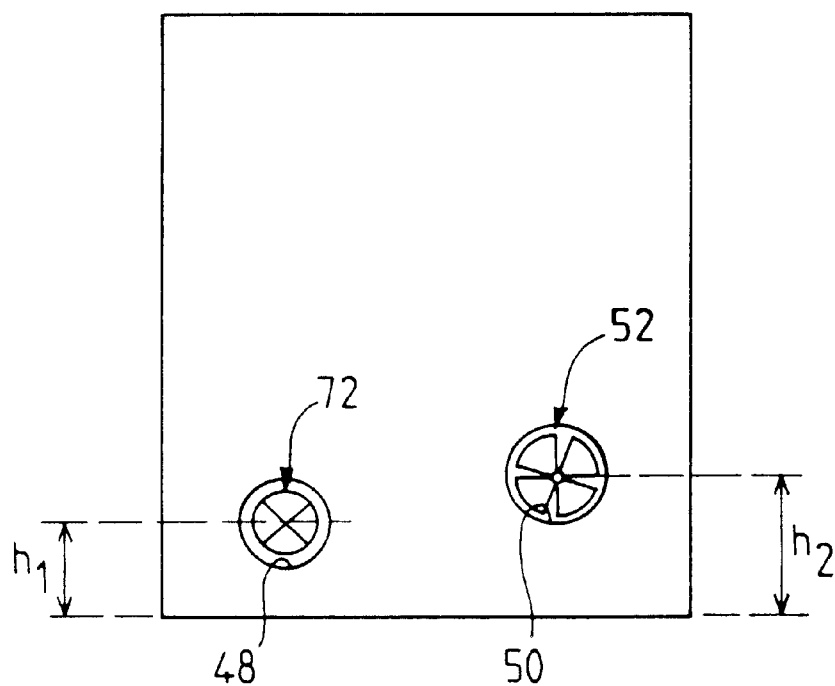
FIGS. 7 and 8 are elevations analogous to FIG. 2 and showing other variants.

In the embodiment of FIG. 7 the device is like that of FIGS. 1 and 3 and could include or not include a double U-shaped circulation arrangement. It has an opening 50 provided with an electric fan 52 and an opening 48 provided with a gravity-operated flap valve 72. In the example the fan and the valve are situated in different openings placed at the levels h1 and h2 which could be the same or different. In a variant they could be placed in the same opening.

Figure 8:
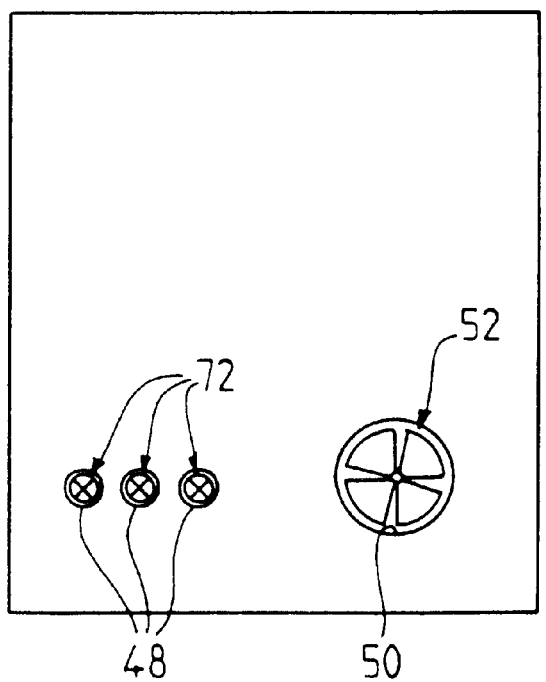

In embodiment of FIG. 8 the device is comparable with that of FIGS. 1 and 3 and could include or not include a double U-shaped circulation arrangement. It has an opening 50 provided with an electric fan 52 and openings 48 each provided with a gravity-operated flap valve 72.

Figure 9:
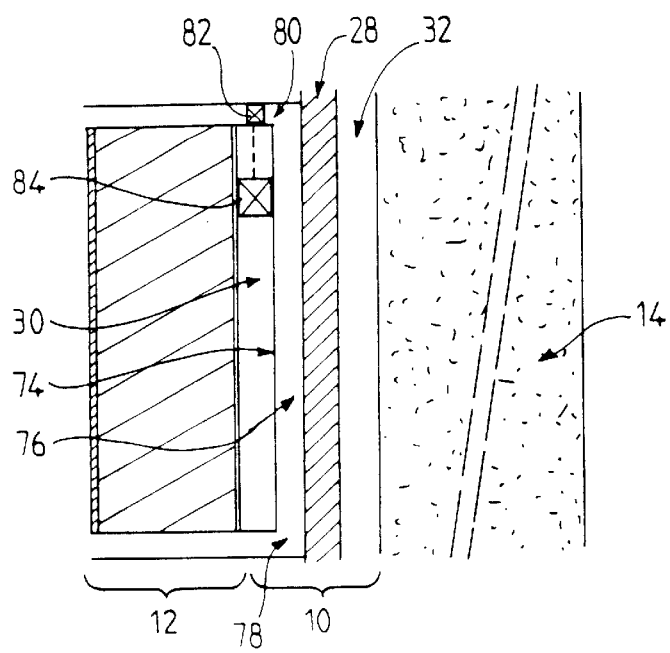
FIG. 9 is a partly sectioned view of a device according to the invention including a blocking space.

The device according to FIG. 9 has a supplementary plate 74, a "stopper plate", realized for example in the form of a sheet of aluminium and placed between the panel 12 and the insulating plate 28 in such a way as to allow the creation of a closed blocking space 76 between the external space 30 and the insulating plate 28. Where appropriate, this blocking space could be ventilated, preferably by a natural current of air through a fixed opening 78 at the bottom and an opening 80 provided with a valve 82 higher up. The openings 78 and 80 provide communication between the blocking space 76 and the external ambient air through the panel 12. The valve 82 is operated by a bimetallic strip 84 when the temperature reaches a certain threshold. This strip is placed into the external space 30 behind the panel 12.

Figure 10:
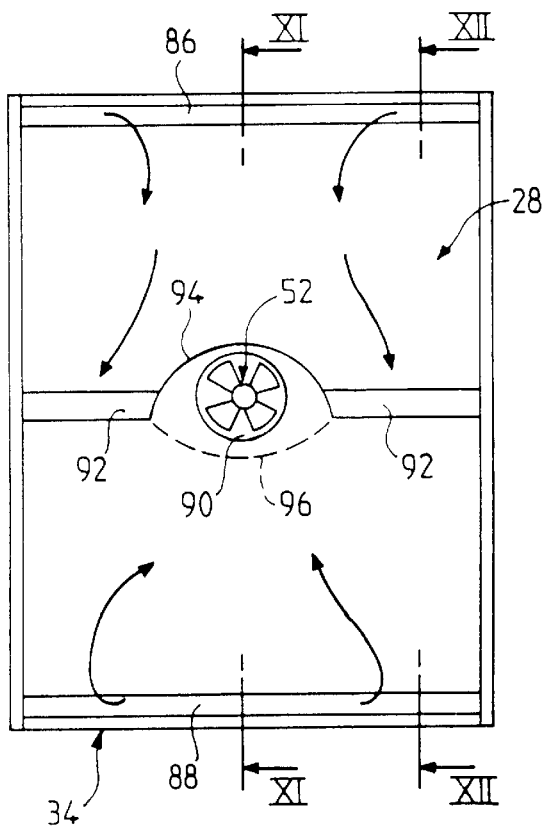
FIG. 10 is an elevation of a transfer device showing another embodiment of the invention.
Figures 11, 12:
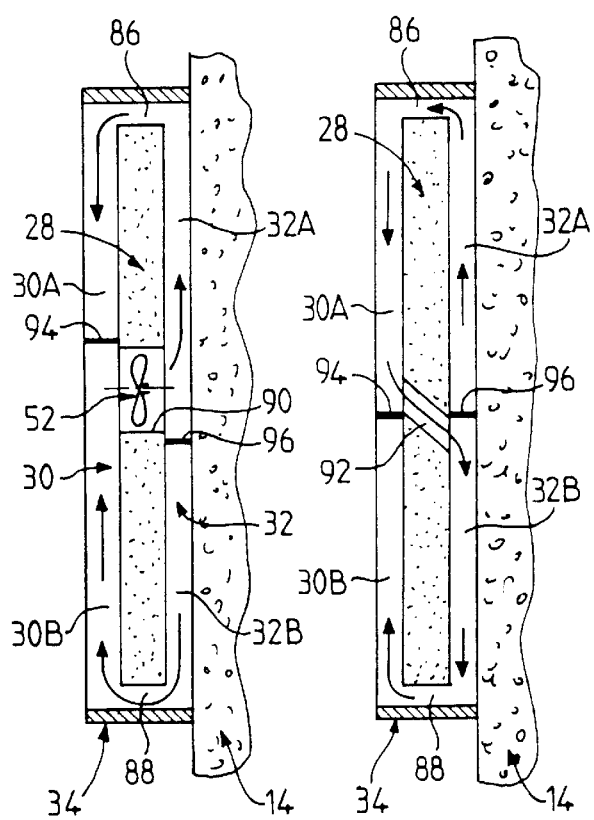
FIG. 11 is a section on the line XI—XI in FIG. 10.
FIG. 12 is a section on the line XII—XII in FIG. 10.

In the embodiment of FIGS. 10 to 12 the device is a module having a frame 34 supporting an insulating plate 28. This plate 28 is provided respectively at the top and the bottom with two openings 86 and 88 of rectangular shape extending horizontally to provide communication between the external space 30 and the internal space 32.

The insulating plate 28 is also provided with a central opening 90 of circular shape in which is mounted an electric fan 52 and two lateral openings 92 of oblong shape arranged one on each side of the central opening 90 on a horizontal line.

Furthermore of the external space 30 is divided by a substantially horizontal partition 94 into two superposed compartments 30A and 30B, whereas the internal space 32 is divided by a substantially horizontal partition 96 into two superposed compartments 32A and 32B.

The result is that a flow of air can circulate from one space to the other under the action of the fan 52, following the path indicated by the arrows. The flow of air passes from the compartment 30B to the compartment 32A through the opening 90, then reaches the compartment 30A through the opening 86. After this the flow of air reaches the compartment 32B through the openings 92 and then returns to the compartment 30B through the opening 88, and so on.

Figure 13:
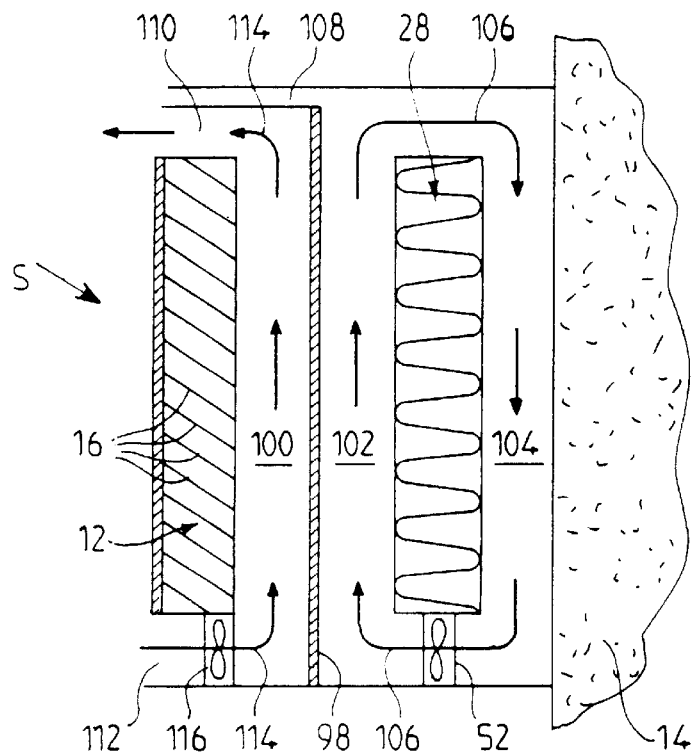
FIG. 13 is a section through a transfer device with two air circuits according to the invention.

In the embodiment of FIG. 13, the device is similar to that of FIG. 9. It has an intermediate plate 98 which is positioned between the panel 12 and the insulating plate 28. This intermediate plate, also called a conversion plate, allows the solar energy to be converted into heat. It generally takes the form of a solid body, preferably black in color.

The result is that the plate 22 formed of a black metal sheet (FIG. 1) could be replaced by the panel 12, and then the conversion of the solar energy into heat is achieved in this case by the intermediate plate.

This allows the creation of three spaces: a space 100 between the panel 12 and the conversion plate 98, a space 102 between the plate 98 and the insulating plate 28, and a space 104 between this insulating plate and the wall surface 14.

The spaces 102 and 104 allow the creation of a first air circuit, indicated by the arrows 106, under the action of the first air circulating means constituted here by a fan 52 analogous to that described as earlier. This fan 52 is provided in the lower part of the insulating plate 28. This first air circuit communicates with the outside atmosphere through a small pressure-balancing opening 108.

Furthermore the space 100 communicates with the atmosphere through two openings 110, 112, respectively in the upper region and in the lower region. This allows the creation of the second air circuit indicated by the arrows 114, under the action of a fan 116 positioned in the lower region of the space 100.

The first circuit 106 is in principle a closed circuit which communicates with the outside solely through the pressure-balancing opening 108. Here the second circuit 114 is open to the outside but in a variant it could be closed.

The first circuit constitutes a heating circuit designed to transfer the heat from the conversion plate 98 to the wall surface 14, and vice versa, according to whether one is in a winter or summer regime. In fact this first circuit corresponds to the different circuits described earlier.

The second circuit constitutes a cooling circuit which is designed to reject the heat to the outside. It could remove the heat from the wall surface 14 to the outside (for example at night in summer) and/or remove the excess heat from the conversion plate 98 to the outside (for example on a sunny day in summer).

The first air circulating means 52 and the second air circulating means 116 can be placed selectively and independently in an open state or a closed state, thus defining altogether four possible operating states.

Figure 14:
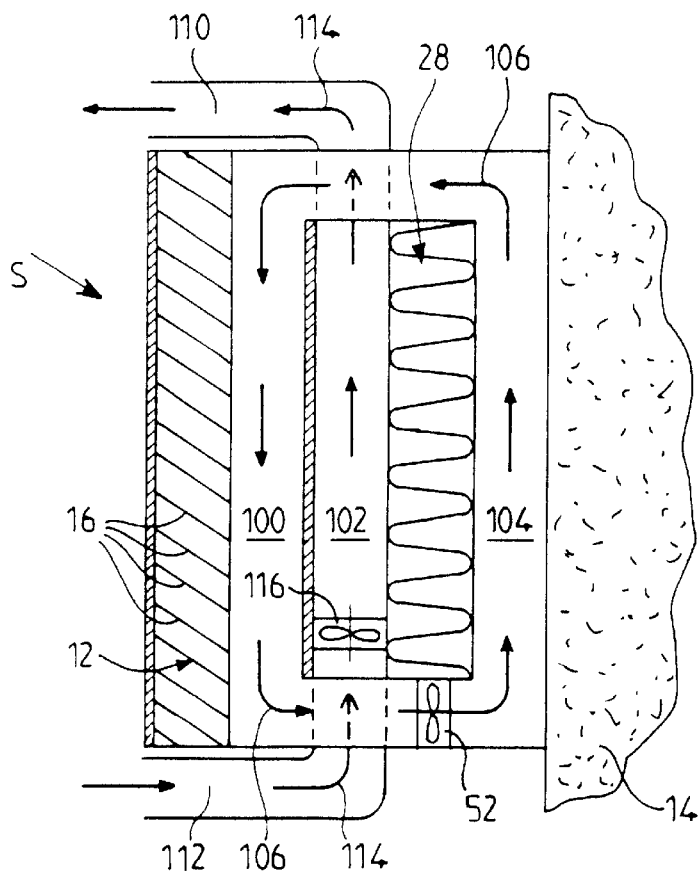
FIG. 14 is a section analogous to FIG. 13 showing a variant.

These two circuits are open to numerous variations, one of which is illustrated in FIG. 14. In this version the first circuit 106 follows the spaces 100 and 104, while the second circuit 114 uses the space 102.

In a variant, these two circuits could have part of their path in common and comprise air circulating means with fans and valves operating as spurs to the achievement of either heating or cooling.

In another variant the second circuit could be confined to a single space. In that case a fan placed in this space causes turbulence and, as a consequence, a good convection between walls. Moreover with the fan stopped, this space then acts as an insulator.

It will be understood that the invention is not limited to the embodiments described above by way of example, and extends to other variants.

It will be appreciated that the conversion of the solar energy into heat is achieved on a solid body, preferably black, which could be a plate (in principle a sheet) placed against the transparent insulation (plate 22 in FIG. 1) or equally well against the insulating wall 28, or even midway between the transparent insulation and the insulating wall 28 (intermediate plate 98 of FIGS. 13 and 14).

Instead of a plate one could make use of an opaque surface which could for example be situated on the back face of a glazed area. One could even make use of a network or grid, for example a mineral or metallic wool which is permeable to air.

In the examples described above the shaped elements 16 of the panel 12 (see FIG. 1) define rising channels. However it is also possible to envisage inclining them in the opposite sense to create channels descending from outside to inside.

Furthermore, when the device is realized in the form of a module it could be arranged that the frame supports the assembly of components of the device including the panel.

The device according to the invention thus allows complete mastery of the four situations listed above and allows the initiation or prevention of the transfer of heat as a function of the conditions which are encountered and of the instructions of the user.

What is claimed is:

1. Device for transferring heat between a panel to be heated by solar radiation and a wall, the device comprising:
   an insulating plate mounted parallel between the panel and the wall to define an external closed space between the panel and the insulating plate, and an internal closed space between the insulating plate and the wall;
   a partition mounted in each of the external space and the internal space to define therein at least one U-shaped path with two branches for air circulation, one branch on each side of the partition;
   an air circulator interposed between the external space and the internal space,
   wherein said air circulator includes at least two openings provided in the insulating plate, each of which is designed to provide fluid communication between the branches of the external space, and fluid communication between the branches of the internal space; and
   a first fan positioned in at least one of the at least two openings and operable in the following two states:
      an open state allowing circulation of air between the external space and the internal space via at least one of the at least two openings to allow heat transfer between the panel and the wall; and
      a closed state preventing circulation of air between the external space and the internal space to prevent transfer of heat between the panel and the wall.

2. Device according to claim 1, wherein the at least two openings are positioned substantially at a same distance from a lower edge of the wall of the device.

3. Device according to claim 1, wherein one of the at least two openings is provided between a first branch of the external space and a first branch of the internal space, and another of the at least two openings is provided between a second branch of the external space and a second branch of the internal space.

4. Device according to claim 1, wherein the first fan is an electric fan operable between on and off states, corresponding respectively to the open state and the closed state.

5. Device according to claim 1, wherein the first fan is an electric fan, and a valve is situated in one of the at least two openings.

6. Device according to claim 1, further comprising a supplementary plate positioned between the panel and the insulating plate to create a closed blocking space between the external space and the insulating plate.

7. Device according to claim 1, further comprising an intermediate plate between the panel and the insulating plate creating a first air circuit to transfer heat between the intermediate plate and the wall, and a second air circuit to extract the heat towards an outside atmosphere,
   wherein the first fan drives the air in the first air circuit and a second fan drives the air in the second air circuit, and
   wherein the first and second fans are operable between on and off states, corresponding respectively to the open state and the closed state.

8. Device according to claim 7, wherein the first air circuit is a closed circuit capable of communicating with the outside atmosphere through a small pressure balancing opening, and
   wherein the second air circuit is one of a closed circuit or is open to the atmosphere.

9. Device according to claim 1, further comprising a controller to control the first fan.

10. Device according to claim 9, wherein the controller is manually activated.

11. Device according to claim 9, wherein the controller includes at least two temperature sensors designed to detect the temperatures of at least one of the panel, the intermediate plate, and the wall, in order to control the first fan as a function of differences in temperature.

12. Device according to claim 9, wherein the controller is an automatic controller.

13. Device according to one of claim 9, wherein the controller include at least one photo-responsive component to detect isolation on the panel and to generate a voltage representative of the isolation.

14. Device according to claim 13, wherein the voltage generated by the photo-responsive component is used to power the first fan.

15. Device according to claim 13, wherein the voltage generated by the photo-responsive component is used to form a signal to turn the first fan on or off.

16. Device according to claim 1, wherein the device is a module including a frame.

* * * * *